United States Patent
Inoue et al.

(10) Patent No.: US 10,070,453 B2
(45) Date of Patent: Sep. 4, 2018

(54) RADIO BASE STATION APPARATUS AND SCHEDULING METHOD

(71) Applicant: NTT DOCOMO, INC., Tokyo (JP)

(72) Inventors: Yuki Inoue, Tokyo (JP); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/910,157

(22) PCT Filed: Jul. 7, 2014

(86) PCT No.: PCT/JP2014/068065
§ 371 (c)(1),
(2) Date: Feb. 4, 2016

(87) PCT Pub. No.: WO2015/019776
PCT Pub. Date: Feb. 12, 2015

(65) Prior Publication Data
US 2016/0183275 A1 Jun. 23, 2016

(30) Foreign Application Priority Data

Aug. 6, 2013 (JP) .................................. 2013-163655

(51) Int. Cl.
*H04W 72/12* (2009.01)
*H04B 7/06* (2006.01)
(Continued)

(52) U.S. Cl.
CPC .......... *H04W 72/12* (2013.01); *H04B 7/0695* (2013.01); *H04W 72/044* (2013.01);
(Continued)

(58) Field of Classification Search
CPC ... H04W 72/12; H04W 72/044; H04W 88/08; H04B 7/0695; H04B 7/10; H01Q 21/061; H01Q 1/246
See application file for complete search history.

(56) References Cited

U.S. PATENT DOCUMENTS

2012/0300728 A1* 11/2012 Lee, II .................... H04J 13/16
370/329
2013/0070741 A1* 3/2013 Li ........................ H04W 72/046
370/338
(Continued)

FOREIGN PATENT DOCUMENTS

JP 2009-171535 A 7/2009
JP 2012-044408 A 3/2012
(Continued)

OTHER PUBLICATIONS

International Search Report issued in PCT/JP2014/068065 dated Aug. 26, 2014 (1 page).
(Continued)

*Primary Examiner* — Marcos Torres
(74) *Attorney, Agent, or Firm* — Osha Liang LLP

(57) ABSTRACT

A radio base station apparatus has a multimode antenna providing multiple antenna configurations, an acquisition unit configured to acquire channel information of user equipment and at least one of location information of the user equipment and phase difference information between antenna ports of signals transmitted from the user equipment, and a determination unit configured to determine scheduling for the user equipment together with an antenna configuration to be allocated to the user equipment, based upon the acquired information.

8 Claims, 19 Drawing Sheets

(51) Int. Cl.
*H04W 72/04* (2009.01)
*H04B 7/10* (2017.01)
*H04W 88/08* (2009.01)
*H01Q 1/24* (2006.01)
*H01Q 21/06* (2006.01)

(52) U.S. Cl.
CPC ........... *H01Q 1/246* (2013.01); *H01Q 21/061* (2013.01); *H04B 7/10* (2013.01); *H04W 88/08* (2013.01)

(56) References Cited

U.S. PATENT DOCUMENTS

| | | | |
|---|---|---|---|
| 2014/0009338 A1* | 1/2014 | Lin | H01Q 3/247 342/374 |
| 2014/0192761 A1 | 7/2014 | Inoue et al. | |
| 2016/0149680 A1* | 5/2016 | Kang | H04B 7/0417 370/329 |

FOREIGN PATENT DOCUMENTS

| JP | 2013-042340 A | 2/2013 |
|---|---|---|
| WO | 2013024853 A1 | 2/2013 |

OTHER PUBLICATIONS

Written Opinion of the International Searching Authority issued in PCT/JP2014/068065 dated Aug. 26, 2014 (5 pages).

Inoue, Y. et al.; "Evaluation of MIMO Base Station Antenna Employing Vertically Split Array and the Propagation"; IEICE Technical Report, vol. 110, No. 267 Nov. 10-12, 2010, pp. 35-39 (6 pages).

Office Action issued in corresponding Japanese Application No. 2013-163655, dated May 23, 2017 (5 pages).

Office Action issued in the counterpart Chinese Patent Application No. 201480044369.0, dated Aug. 25, 2017 (19 pages).

* cited by examiner

FIG.5

ANTENNA CONFIGURATION 1
(HORIZONTAL ARRAY CONFIGURATION)

| Port #1 to #4<br>Vertical Polarization | Group #1 |
|---|---|
| Port #1 to #4<br>Horizontal Polarization | Group #2 |
| Port #5 to #8<br>Vertical Polarization | Group #3 |
| Port #5 to #8<br>Horizontal Polarization | Group #4 |

FIG.6

ANTENNA CONFIGURATION 2
(VERTICAL DIVERSITY CONFIGURATION)

| Port #1 and #2<br>Vertical Polarization | Group #1 |
|---|---|
| Port #1 and #2<br>Horizontal Polarization | Group #2 |
| Port #3 and #4<br>Vertical Polarization | Group #3 |
| Port #3 and #4<br>Horizontal Polarization | Group #4 |

FIG.7

ANTENNA CONFIGURATION 3
(VERTICAL ARRAY CONFIGURATION)

| | |
|---|---|
| Port #1<br>Vertical Polarization | Group #1 |
| Port #1<br>Horizontal Polarization | Group #2 |
| Port #2<br>Vertical Polarization | Group #3 |
| Port #2<br>Horizontal Polarization | Group #4 |
| Port #3<br>Vertical Polarization | Group #5 |
| Port #3<br>Horizontal Polarization | Group #6 |
| Port #4<br>Vertical Polarization | Group #7 |
| Port #4<br>Horizontal Polarization | Group #8 |
| Port #5<br>Vertical Polarization | Group #9 |
| Port #5<br>Horizontal Polarization | Group #10 |
| Port #6<br>Vertical Polarization | Group #11 |
| Port #6<br>Horizontal Polarization | Group #12 |
| Port #7<br>Vertical Polarization | Group #13 |
| Port #7<br>Horizontal Polarization | Group #14 |
| Port #8<br>Vertical Polarization | Group #15 |
| Port #8<br>Horizontal Polarization | Group #16 |

FIG.8

OTHER ANTENNA CONFIGURATION
(HORIZONTAL ARRAY VERTICAL
DIVERSITY CONFIGURATION)

| Port #1 and #2 Vertical Polarization | Group #1 |
|---|---|
| Port #1 and #2 Horizontal Polarization | Group #2 |
| Port #3 and #4 Vertical Polarization | Group #3 |
| Port #3 and #4 Horizontal Polarization | Group #4 |
| Port #5 and #6 Vertical Polarization | Group #5 |
| Port #5 and #6 Horizontal Polarization | Group #6 |
| Port #7 and #8 Vertical Polarization | Group #7 |
| Port #7 and #8 Horizontal Polarization | Group #8 |

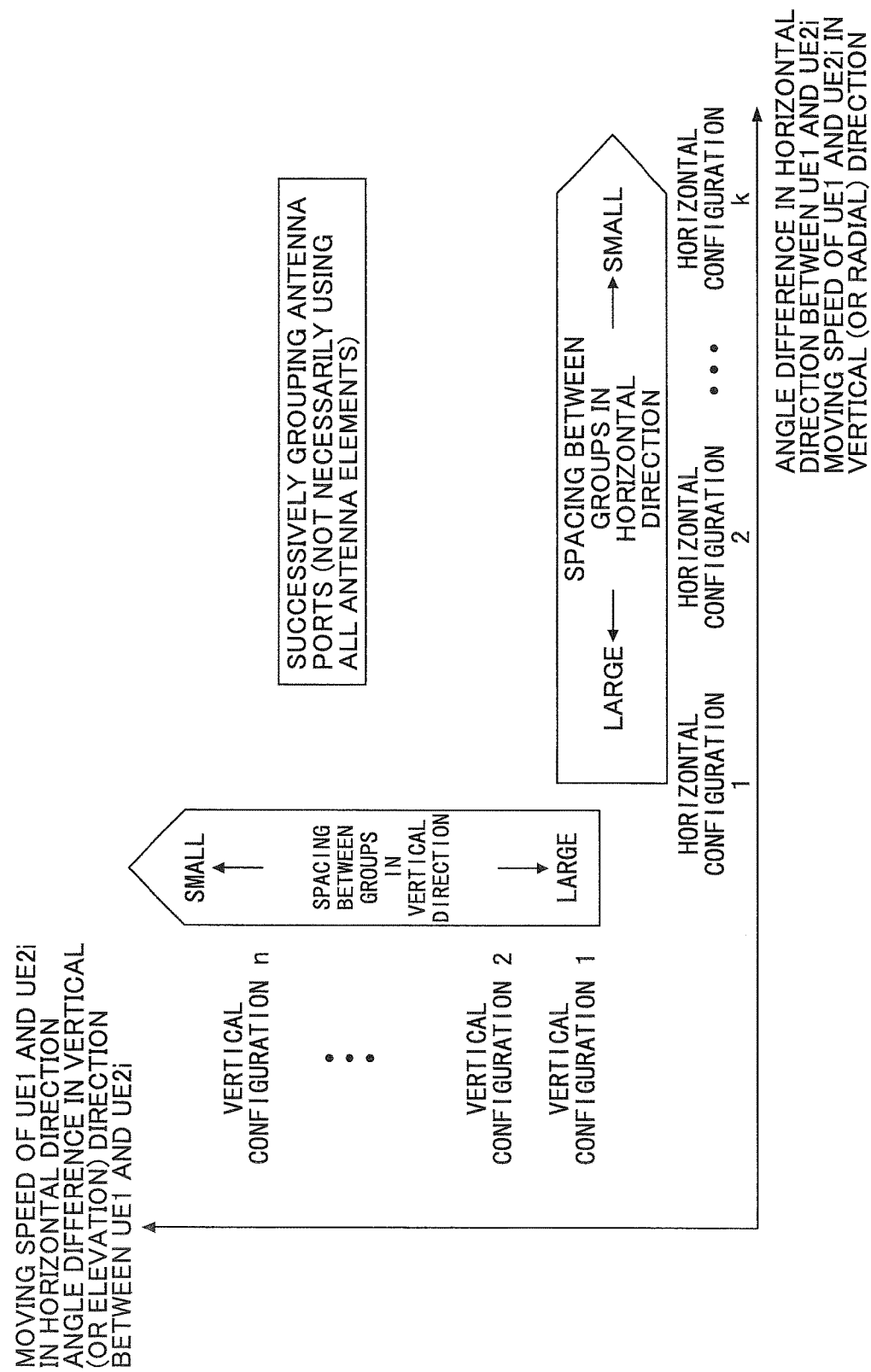

RADIO BASE STATION APPARATUS AND SCHEDULING METHOD

TECHNICAL FIELD

The present invention relates to a radio communication technology, and more particularly, to a radio base station apparatus with a multimode antenna and a scheduling method for selecting the optimum antenna configuration according to information about one or more users.

BACKGROUND ART

An active antenna system (AAS) using vertically arranged antenna elements is being discussed. Implementation of three-dimensional multiple input multiple output (3D-MIMO) with antenna elements arranged in the horizontal and vertical directions is also discussed. In these antenna architectures, it may be expected that each of the antenna elements is connected to associated one of transmission/receiving circuits and that the phases and the amplitudes of signals are controlled individually. In this scenario, antenna ports may be set up corresponding to the respective antenna elements, or an antenna port may be allocated to a group or a combination of two or more antenna elements.

In general, an antenna port corresponds to a MIMO branch; however, multiple antenna ports may be divided into groups such that each group corresponds to a MIMO branch. When multiple antenna ports are provided, different antenna configurations can be produced depending on how the antenna ports are grouped. For example, a multimode antenna in which antenna elements are grouped into sections for data transmission/reception depending on the communication type such as scheme, rank, or the number of users to be multiplexed is proposed. See, for example, Patent Document 1 listed below.

Long term evolution (LTE) systems provide two types of MIMO transmission. In single user MIMO (SU-MIMO) transmission, data sequences transmitted simultaneously from different antenna branches are addressed to the same user. In multi-user MIMO (MU-MIMO) transmission, data sequences transmitted from multiple antenna branches are addressed to two or more users.

In single user MIMO, transmission data sequences are transmitted simultaneously and parallel to each other by controlling the phases and the amplitudes of signals of the respective data sequences for the associated antenna branches. Alternatively, antenna branches with less mutual correlation may be selected to transmit the data sequences simultaneously and in parallel. In multi-user MIMO, inter-user interference is reduced to achieve simultaneous and parallel data transmission by controlling the phases and the amplitudes of signals of different transmission antenna branches for the respective users, or for the respective users and transmission data streams. Alternatively, antenna branches with less mutual correlation may be used to transmit data to two or more users simultaneously and parallel to each other.

In SU-MIMO scheduling, an ordinary scheduling scheme such as proportional fairness, round robin or Max CIR may be employed by determining a rank based upon the receiving quality. On the other hand, in MU-MIMO scheduling, it is proposed to implement optimum resource allocation taking the receiving quality into account when spatially multiplexing user data items using M antenna elements over one resource block. See, for example, Patent Document 2 listed below.

With the scheduling technique described in Patent Document 2, the scheduling process is implemented every moment independently. When the positional relationship changes between travelling user equipment units, fluctuation in the user equipment becomes large and the temporal robustness for scheduling against the positional change is low. For this reason, resource allocation is updated frequently and the scheduling workload increases. Besides, orthogonality is calculated for all the combinations of users with round robin for each antenna configuration based upon the channel estimation results responsive to the number of antenna ports, and then comparison is made. The amount of calculation dramatically increases. Assuming increase of the number of antenna ports and the number of antenna configurations in coming years, a practical method for scheduling users and antenna configurations has not been established.

PRIOR ART DOCUMENTS

PATENT DOCUMENT 1: Japanese Patent Application Laid-Open Publication No. 2012-44408

PATENT DOCUMENT 2: Japanese Patent Application Laid-Open Publication No. 2009-171535

SUMMARY OF THE INVENTION

Technical Problem to be Solved

With 3D-MIMO or elevation beamforming, a large number of antenna ports are used, and a huge amount of calculation time is taken to process the channel information for all the combinations of antenna configurations. There will be some problem expected that processing delay occurs and channel information cannot follow the channel fluctuation.

Accordingly, it is an objective of the invention to provide a method and a structure that can reduce processing delay and achieve efficient scheduling in a system using an antenna implementing multiple antenna configurations (which antenna is called a multimode antenna).

Means for Solving the Problem

To achieve the objective, scheduling for user equipment is determined together with allocation of an antenna configuration based upon channel information and at least one of location information of each user equipment and phase difference information of uplink signals among antenna ports. When determining a user pair from the location information, it is unnecessary to calculate orthogonality for all candidates of user pairs in round robin from the channel state information of all the antenna configurations for comparison. Consequently, the amount of calculation can be reduced. Location information may include, but is not limited to, the current position of user equipment, distance from the base station, moving speed, moving direction, and user distribution.

In one aspect of the invention, a radio base station apparatus has a multimode antenna providing multiple antenna configurations, an acquisition unit configured to acquire channel information of user equipment and at least one of location information of the user equipment and phase difference information between antenna ports as to signals transmitted from the user equipment, and a determination unit configured to determine scheduling for the user equipment together with an antenna configuration to be allocated to the user equipment, based upon the acquired information.

Advantageous Effect of the Invention

With the above-described structure and method, processing delay can be reduced and scheduling and selection of antenna configuration can be performed efficiently for each user, while following channel fluctuation well, when spatially multiplexing users using a multimode antenna.

BRIEF DESCRIPTION OF THE DRAWINGS

FIG. 5 illustrates antenna configuration 1;

FIG. 6 illustrates antenna configuration 2;

FIG. 7 illustrates antenna configuration 3;

FIG. 8 illustrates another example of grouping for an antenna configuration;

FIG. 23 is a diagram illustrating selection of antenna configuration response to location information of a UE pair.

EMBODIMENTS TO CARRY OUT THE INVENTION

Figure 1:
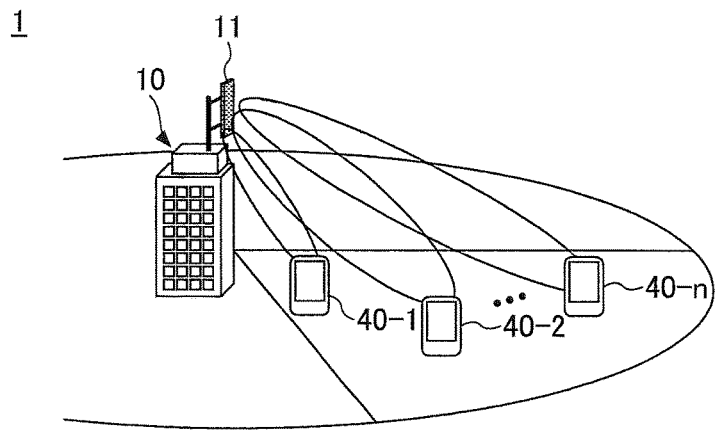
FIG. 1 is a schematic diagram of a radio communication system to which the present invention is applied.

FIG. 1 is a schematic diagram of a radio communication system 1 to which the present invention is applied. The ratio communication system 1 includes a radio base station apparatus (which may be called an evolved node B abbreviated as "eNB") 10 and user equipment (UE) 40-1, 40-2, ..., 40-$n$ (which may be referred to collectively as "UE 40"), where n is an integer greater than zero (n>0). The eNB 10 has a multimode antenna 11 that is capable of forming directional beams according to communication types and changing antenna configurations.

The eNB 10 transmits data to the respective UEs 40 using a part or all of the antenna elements of the multimode antenna 11.

The eNB 10 selects a single UE or a pair or group of UEs from among the UE40-1, 40-2, ..., 40$n$ (n is a positive integer) according to the location information, and selects an antenna configuration to be allocated to the UE or the UE pair or UE group. In this context, "antenna configuration" is a configuration determined by way of dividing the antenna ports of the multi-port antenna 11 into groups or branches. Using multiple antenna configurations, the eNB 10 carries out scheduling for UEs 40 efficiently.

Embodiment 1

Figure 2:
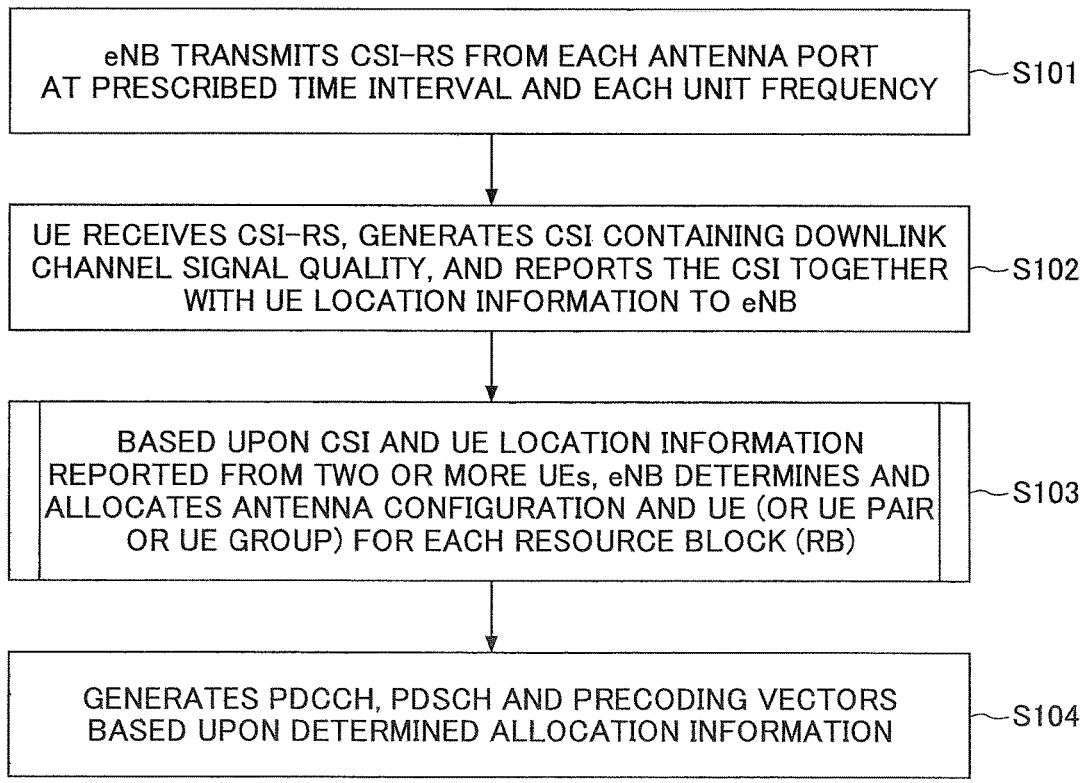
FIG. 2 is a flowchart of a scheduling method including determination of antenna configuration according to Embodiment 1.

FIG. 2 is a flowchart of a scheduling method including determination of antenna configuration according to Embodiment 1. In step S101, the eNB 10 transmits a downlink reference signal from each antenna port at a prescribed time interval and every unit frequency. The downlink reference signal may be transmitted from each of the branches formed by grouping the antenna ports, instead of transmitting the reference signal from each antenna port. The downlink reference signal is, for example, a channel state information reference signal (CSI-RS); however, other reference signals such as cell-specific reference signal (CRS) or demodulation reference signal (DM-RS) may be used. In this example, CSI-RS is used.

Then, in step S102, each UE 40 receives the CSI-RS, generates CSI including the downlink channel receiving quality, and transmits the CSI together with location information of UE 40 to the eNB 10 over an uplink control channel. CSI is information generated based upon the instantaneous channel state of the downlink. CSI may include precoding matrix indicator (PMI) and/or rank indicator (RI) in addition to channel quality indicator (CQI).

Then, in step S103, the eNB 10 determines an antenna configuration and a UE, or a UE pair or a UE group to which the antenna configuration is allocated at every radio resource block (RB) based upon the CSI and UE location information reported from the UEs 40, thereby allocating the antenna configuration and the resource block to the UE or the UE pair or the UE group. The details of this step are described below.

Then, in step S104, the eNB 10 generates a physical downlink control channel (PDCCH), a physical downlink shared channel (PDSCH) and precoding weights based upon the determined allocation information. Control signals and data signals are transmitted over the PDCCH and PDSCH, respectively, using a directional beam formed by the precoding weights.

Figure 3:
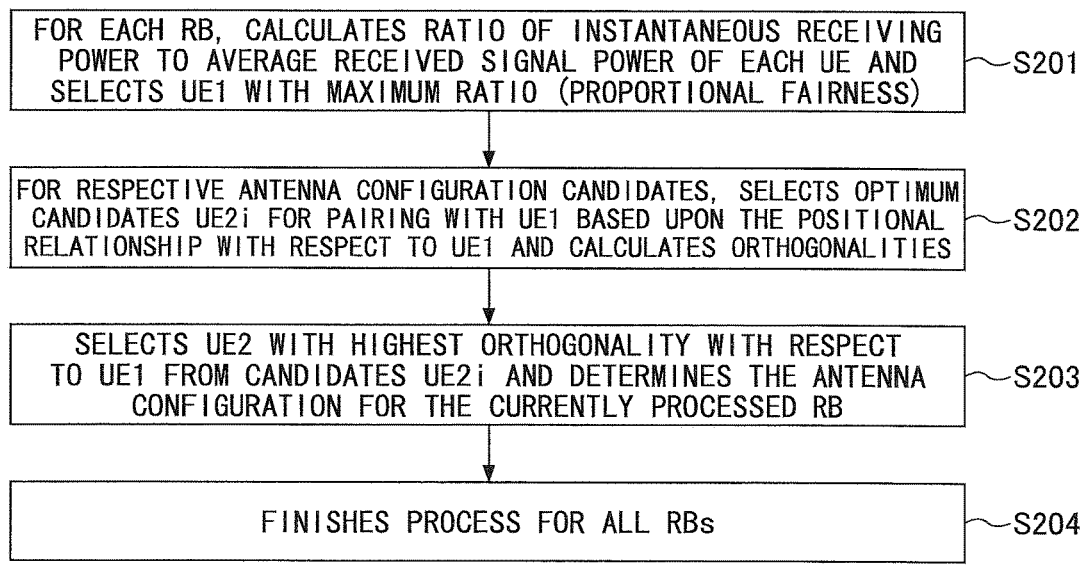
FIG. 3 is an illustrative flow of determination of an UE pair and antenna configuration in the method of FIG. 2.

FIG. 3 is an illustrative flow of the determination of a UE pair and the antenna configuration formed in step S103 of FIG. 2. In step S201, the eNB 10 calculates a ratio of the instantaneous received power to the average received power of the signal from each of the UEs 40 at each RB and selects a UE with the maximum ratio (which UE is referred to as "UE1"). This technique is called proportional fairness. The focused-on radio resource is allocated to a UE 40 at which the instantaneous throughput is expected to increase upon allocation of the radio resource compared to the average throughput until that time. Of course, the scheduling technique is not limited to this method, and any appropriate technique may be employed to determine the highest priority UE to allocate the radio resource.

Figure 12:
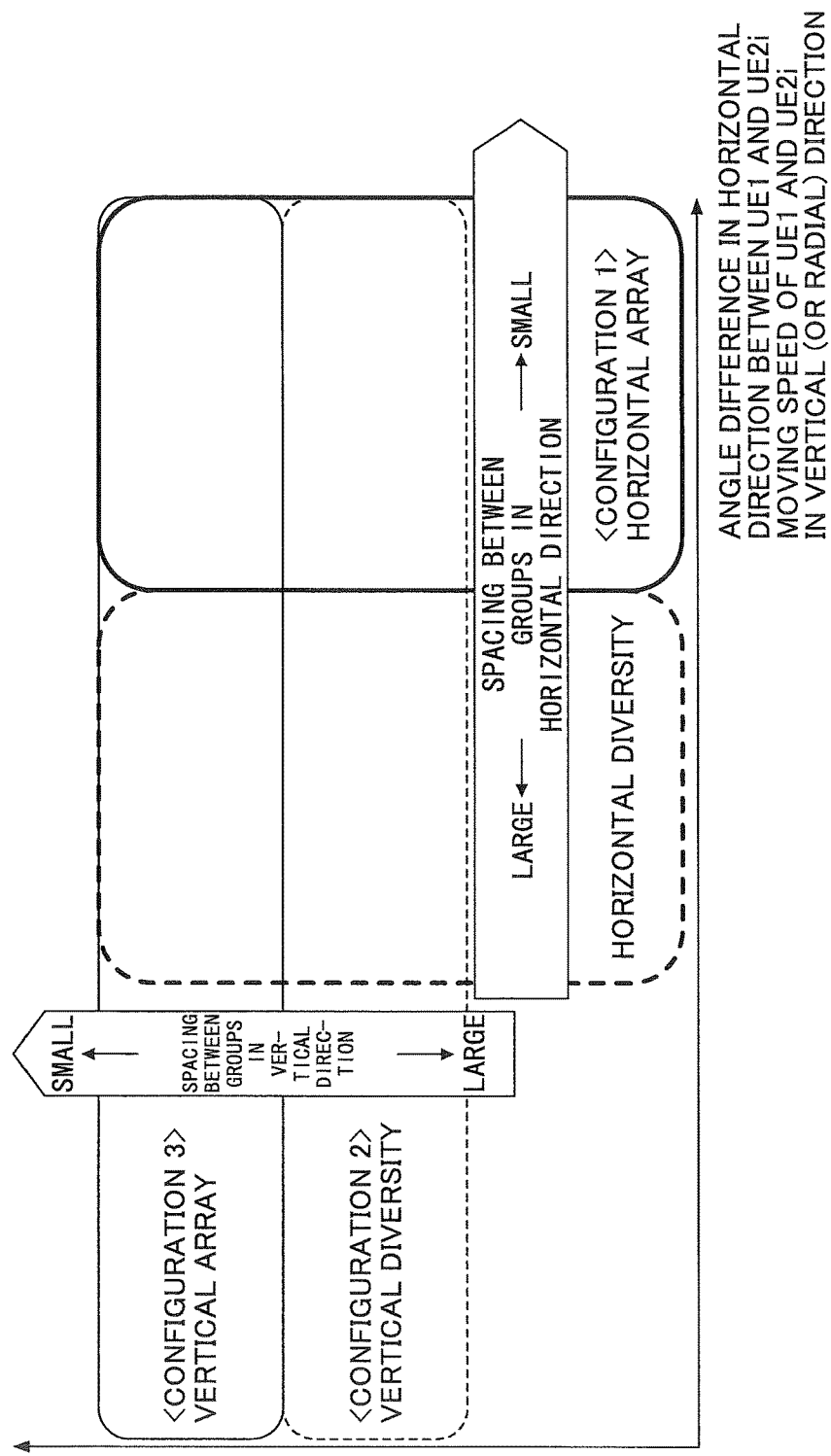
FIG. 12 illustrates a relationship between the location information of a UE pair and antenna configuration.

Then, in step S202, for each of "i" candidates of antenna configuration (where "i" denotes the total number of antenna configurations and is a positive integer (i>0)), the optimum candidate UE (which UE is referred to as "UE2i") to be paired with UE1 is selected from all the UEs 40 other than UE1, based upon the positional relationship with UE1 and the antenna configuration selection scheme illustrated in FIG. 12. The antenna configuration selection scheme is described in detail below. This method is advantageous because it is unnecessary to investigate the channel orthogonality in round robin between UE1 and all the other existing UEs 40.

The orthogonality between the candidate UE pair (UE1 and UE2i) is calculated for each of the antenna configurations. Then, in step S203, an antenna configuration j with the highest orthogonality is selected from among i antenna configurations. The pair UE1 and UE2j with the highest orthogonality is finally determined. The antenna configuration providing the highest orthogonality and the currently processed RB are selected for that UE pair.

Then, in step S204, steps 201 to S203 are repeated for all the RBs, and the process terminates when all the RBs have been processed. In this manner, a combination of the appropriate RB and the antenna configuration is selected and allocated for the UEs 40 according to the positional relationship.

Figure 4:
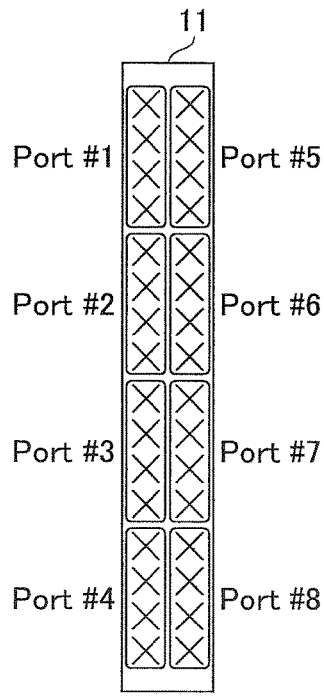
FIG. 4 is a schematic diagram of a multimode antenna used in the radio base station apparatus of the embodiment.

FIG. 4 illustrates an example of the multimode antenna 11 provided to the eNB 10. The multimode antenna 11 has physical antenna elements, sixteen arranged in the vertical direction and two arranged in the horizontal direction. Each of the physical antenna elements can deal with horizontally polarized waves and vertically polarized waves. Accordingly, the structure of FIG. 4 corresponds to the total of 64 elements, (16 lines)×(2 columns)×(2 polarizations). In this example, four physical antenna elements form a port. Taking the polarizations into account, sixteen antenna ports are produced.

FIG. 5 illustrates antenna configuration 1 of the multimode antenna 11. In antenna configuration 1, the antenna ports of the multimode antenna 11 are divided into groups in the horizontal direction. As illustrated in FIG. 5, the vertical polarizations of Port #1 to Port #4 are included in Group 1, the horizontal polarizations of Port #1 to Port #4 are included in Group 2, the vertical polarizations of Port #5 to Port #8 are included in Group 3, and the horizontal polarizations of Port #5 to Port #8 are included in Group 4. The antenna ports are not divided in the vertical direction, and there are two vertical-polarization groups and two horizontal-polarization group arranged in the horizontal direction. The distance between the horizontally adjacent groups is relatively narrow (at or near the half wavelength). Accordingly, a horizontal array equivalent to 4 antenna ports with two columns of dual-polarized antennas is provided. In this regard, the antenna configuration 1 may be named a "horizontal array configuration." When antenna configuration 1 is selected and allocated to a UE by a scheduler, DM-RS or PDSCH are transmitted to this UE under this antenna configuration. The same signal is transmitted from the ports included in the same group.

For example, the vertically polarized antennas of port #1 to port #4 of Group 1 transmit the same signal because of the same group. Antenna configuration 1 is advantageous when a horizontal angle formed by a pair of UEs 40 with respect to the eNB 10, namely an azimuth angle between the UE pair with the eNB 10 as a center, is large. The antenna configuration 1 has high robustness against UE 40 travelling in the horizontal direction as seen from the base station antenna. Accordingly, the antenna configuration 1 is especially advantageous for UE 40 selected by the scheduler when the UE 40 remains stationary relative to the antenna of the base, station (eNB 10) or when the UE 40 is moving in the horizontal direction (circumferential or tangential direction) with respect to the base station antenna.

When performing scheduling for a single user, an antenna configuration with high robustness against the user's moving direction can be selected in the similar manner.

FIG. 6 illustrates antenna configuration 2 of the multimode antenna 11. In antenna configuration 2, the antenna ports of the multimode antenna 11 are divided into groups in the vertical directions. As illustrated in FIG. 6, the vertical polarizations of Port #1 and Port #2 are included in Group 1, the horizontal polarizations of Port #1 and Port #2 are included in Group 2, the vertical polarizations of Port #3 and Port #4 are included in Group 3, and the horizontal polarizations of Port #3 and Port #4 are included in Group 4. The rest of the antenna ports may be used as other branches or may not be used. In this example, the multimode antenna 11 behaves as a 4-port antenna. Because the antenna ports arranged in the vertical direction are provided, suitable beams can be directed to the UEs 40 that exist at different locations in the elevation/depression angle or move along the direction of the elevation/depression angle (moving away from or closer to the base station).

There are two vertical-polarization groups and two horizontal-polarization group arranged in the vertical. The distance between the vertically adjacent groups is relatively large (separating from each other more than several times of wavelength). Accordingly, a vertical diversity antenna equivalent to dual-polarized 4 antenna ports is provided. In this regard, the antenna configuration 2 may be named a "vertical diversity configuration." When antenna configuration 2 is selected and allocated to a UE by a scheduler, DM-RS or PDSCH are transmitted to this UE under this antenna configuration. Antenna configuration 2 is advantageous when there is a certain degree of angle difference between the pair of UEs 40 in the direction of the elevation/ depression angle seen from the eNB 10. The antenna configuration 2 has high robustness against UEs 40 travelling in directions of the elevation/depression angle seen from the base station antenna (moving away from or closer to the base station). Accordingly, the antenna configuration 2 is especially advantageous for a UE 40 selected by the scheduler when the UE 40 remains stationary relative to the antenna of the base station (eNB 10) or when UE 40 is moving in the direction of the elevation/depression angle with respect to the base station antenna (moving away from or closer to the base station). When scheduling is performed for a single user, an antenna configuration with high robustness against the user's moving direction is selected in the similar manner.

FIG. 7 illustrates antenna configuration 3 of the multimode antenna 11. In antenna configuration 3, the antenna ports of the multimode antenna 11 are divided into small groups in the vertical direction. As illustrated in FIG. 7, the vertical polarization elements of Port #1 are included in Group 1, the horizontal polarization elements of Port #1 are included in Group 2, the vertical polarization elements of Port #2 are included in Group 3, the horizontal polarization elements of Port #2 are included in Group 4, the vertical polarization elements of Port #3 are included in Group 5, the horizontal polarization elements of Port #3 are included in Group 6, and so on. In this example, the distance between horizontally adjacent groups is relatively narrow (about half wavelength), and the distance between vertically adjacent groups is about half of that in the antenna configuration 2. For convenience, the antenna configuration 3 is named a "vertical array configuration." When the antenna configuration 3 is selected and allocated to a UE by a scheduler, DM-RS or PDSCH is transmitted to this UE under this antenna configuration.

Antenna configuration 3 is advantageous when the paired UEs are positioned at a relatively large distance from each other in the direction of elevation/depression angle (in the radial direction of the cell). For example, when one of the UE pair is located away from the eNB 10 and the other of the UE pair is located near the eNB 10, the antenna configuration 3 is advantageous. Each UE of the UE pair may stay stationary or move in the horizontal (circumferential or tangential) direction relative to the base station. The UE may move in the oblique direction (containing a component of approaching or separating to or from the base station) in some degree because of the wide beam. When performing scheduling for a single user, an antenna configuration with high robustness against the user's moving direction can be selected in the similar manner.

FIG. 8 illustrates another example of antenna configuration of the multimode antenna 11. In this antenna configuration, each column of the antenna ports of the multimode antenna 11 are divided into several groups in the vertical direction. The vertical polarizations of Port #1 and Port #2 are included in Group 1, the horizontal polarizations of Port #1 and Port #2 are included in Group 2, the vertical polarizations of Port #3 and Port #4 are included in Group 3, the horizontal polarizations of Port #3 and Port #4 are included in Group 4, the vertical polarizations of Port #5 and Port #6 are included in Group 5, the horizontal polarizations of Port #5 and Port #6 are included in Group 6, the vertical polarizations of Port #7 and Port #8 are included in Group 7, and the horizontal polarizations of Port #7 and Port #8 are included in Group 8.

In the vertical direction, there are two groups of vertically polarized antennas and two groups of horizontally polarized antennas. The distance between adjacent groups is relatively large (separated from each other more than several times of wavelength), and vertical diversity is achieved. In the horizontal direction, there are two groups of horizontally polarized antennas and two groups of vertically polarized antennas. The distance between horizontally adjacent groups is relatively narrow (about half wavelength). Accordingly this antenna configuration is equivalent to a horizontal-array vertical-diversity antenna with dual-polarized 8 antenna ports. In this regard, the antenna configuration of FIG. 8 may be named a "horizontal-array vertical-diversity configuration." This antenna configuration is suitable for the situation where there is a certain angle difference between the pair of UEs 40 in the elevation/depression angle seen from the eNB 10 and where the azimuth angle between the UE pair is large. This antenna configuration has high robustness against UEs 40 travelling in the horizontal and vertical directions. When performing scheduling for a single user, an antenna configuration with high robustness against the user's moving direction can be selected in the similar manner.

Figure 9:
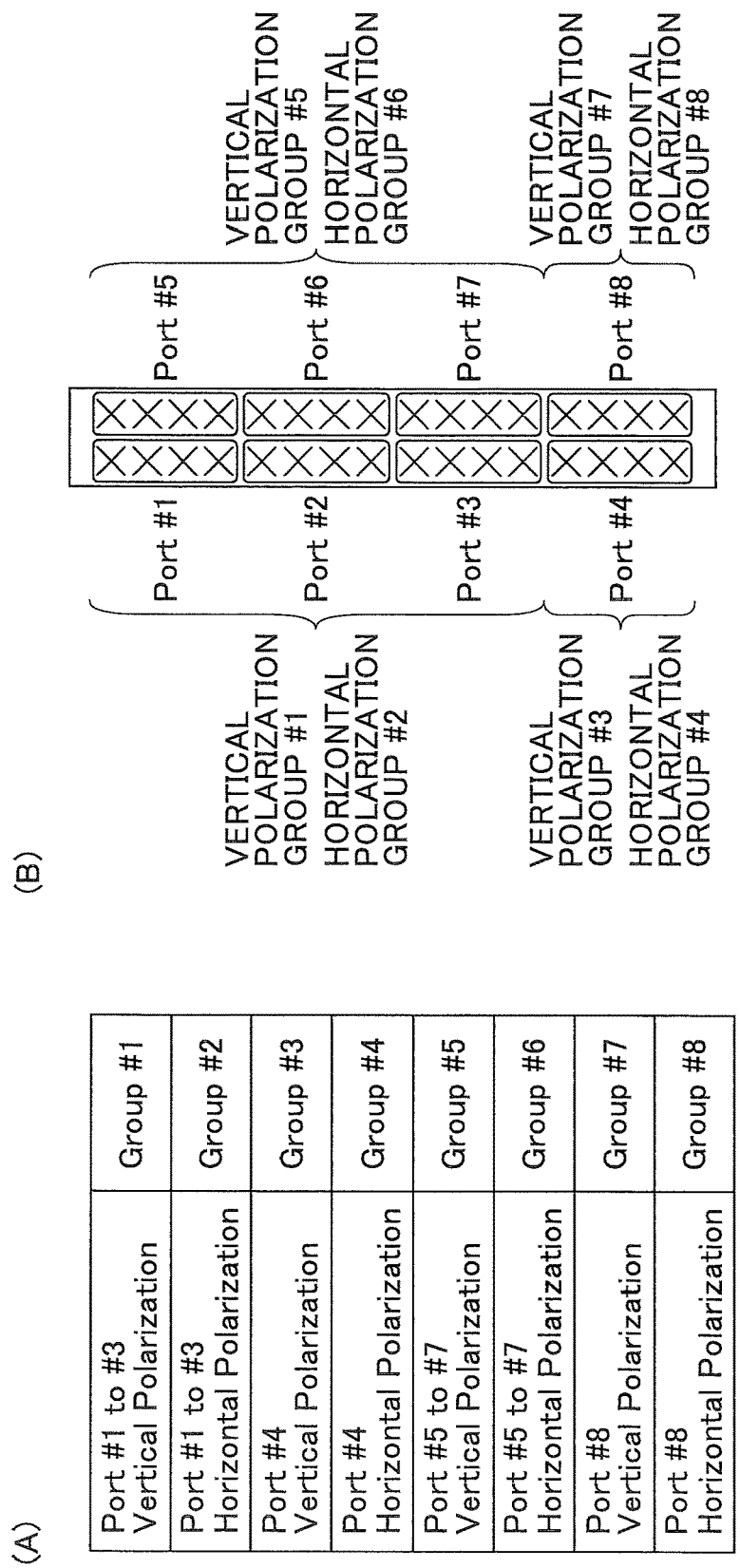
FIG. 9 illustrates still another example of grouping for an antenna configuration.

FIG. 9 illustrates still another example of antenna configuration in which the antenna ports of the multimode antenna 11 are grouped unevenly. The vertical polarizations of Port #1 to Port #3 are included in Group 1, the horizontal polarizations of Port #1 to Port #3 are included in Group 2, the vertical polarization elements of Port #4 are included in Group 3, the horizontal polarization elements of Port #4 are included in Group 4, the vertical polarizations of Port #5 to Port #7 are included in Group 5, the horizontal polarizations of Port #5 to Port #7 are included in Group 6, the vertical polarization elements of Port #8 are included in Group 7, and the horizontal polarization elements of Port #8 are included in Group 8.

By means of uneven grouping, beamforming with different beam widths can be achieved. There is an advantageous effect that the antenna gain can be adjusted when a UE located close to the base station and a UE located away from the base station are paired. When performing scheduling for a single user, the optimum beam can be formed in the similar manner.

Figure 10:
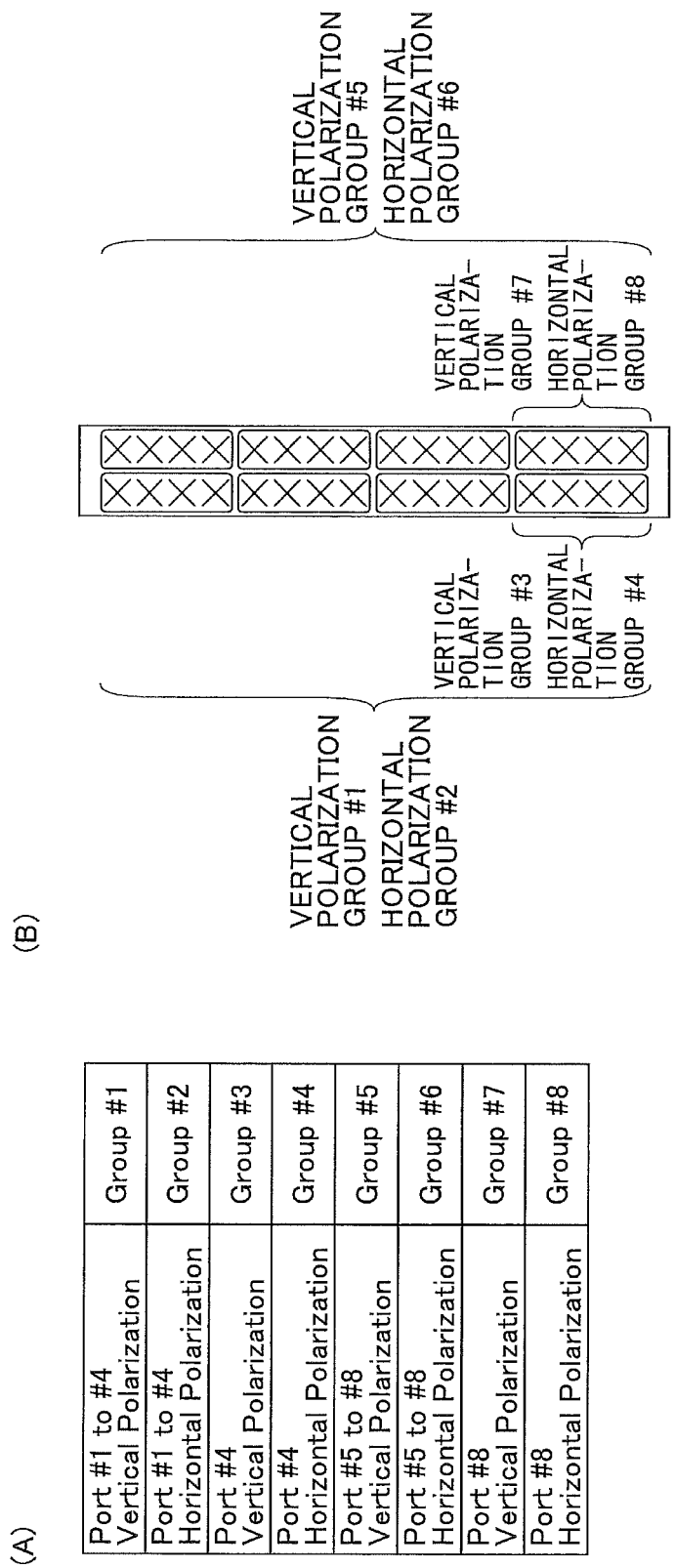
FIG. 10 illustrates yet another example of grouping for an antenna configuration.

FIG. 10. illustrates an example of an antenna configuration in which a part of the antenna ports of the multimode antenna 11 are shared between groups. The vertical polarizations of Port #1 to Port #4 are included in Group 1, the horizontal polarizations of Port #1 to Port #4 are included in Group 2, the vertical polarization elements of Port #4 are included in Group 3, the horizontal polarization elements of Port #4 are included in Group 4, the vertical polarizations of Port #5 to Port #8 are included in Group 5, the horizontal polarizations of Port #5 to Port #8 are included in Group 6, the vertical polarization elements of Port #8 are included in Group 7, and the horizontal polarization elements of Port #8 are included in Group 8. The multimode antenna 11 operates as an eight-port antenna. The vertical polarization component of Port #4 is shared between Group 1 and Group 3, and the horizontal polarization component of Port #4 is shared between Group 2 and Group 4. Similarly, the vertical polarization component of Port #8 and the horizontal polarization component of Port #8 are also shared between Groups. This antenna configuration can also achieve beamforming with different beam widths.

Figure 11:
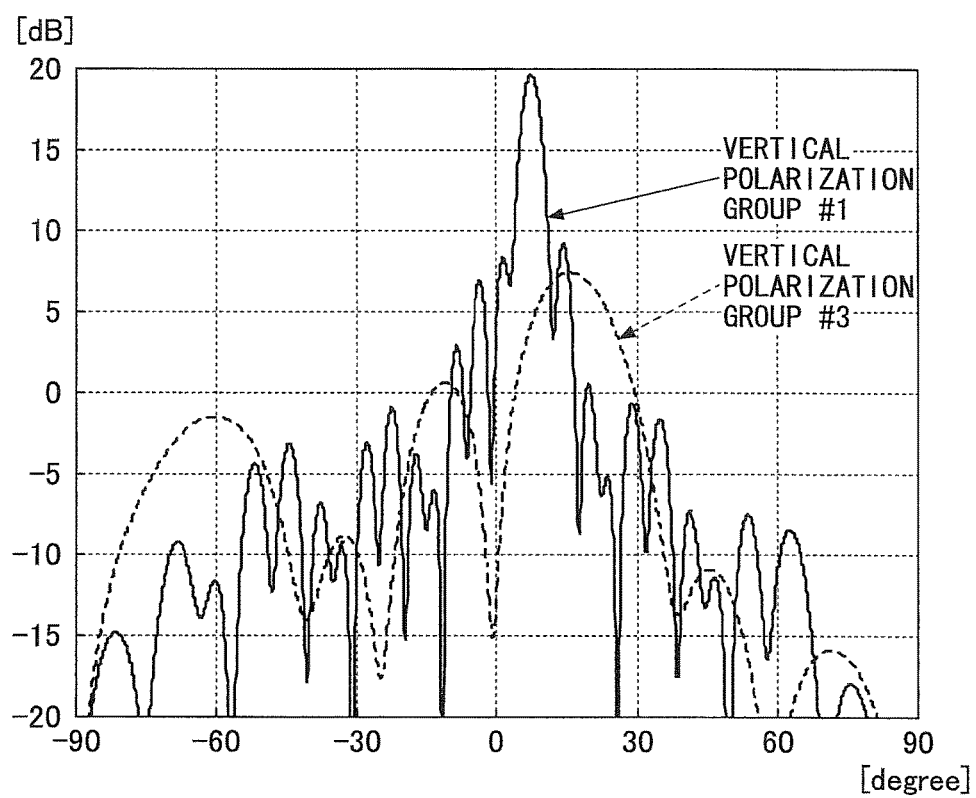
FIG. 11 illustrates examples of beams formed with the antenna configuration of FIG. 9 or FIG. 10.

FIG. 11 illustrates an example of beams formed by the antenna configuration of either FIG. 9 or FIG. 10. For example, a narrow beam depicted by the solid line may be formed for a UE located far from the base station, and a relatively wide beam depicted by the dashed line may be formed for a UE located near the base station.

FIG. 12 illustrates a relationship between antenna configuration and positional relation of UEs 40, as well as a relationship between antenna configuration and moving speed of UEs 40. The horizontal axis represents angle difference between UE1 and UE2$i$ in the horizontal (or circumferential) direction. The horizontal axis also represents moving speed of UE1 and UE2$i$ in the vertical or radial (or elevation/depression angle) direction. The greater the value along the horizontal axis, the smaller the distance between horizontally adjacent antenna groups of the multimode antenna 11 is.

The vertical axis represents angle difference between UE1 and UE2$i$ in the vertical (elevation/depression angle) direction. The vertical axis also represents moving speed of UE1 and UE2$i$ in the horizontal (circumferential) direction. The greater the value along the vertical axis, the smaller the distance between vertically adjacent antenna groups is.

The area defined by the bold solid line indicates a range suitable to antenna configuration 1. The area defined by the bold dashed line indicates a range suitable to horizontal diversity configuration. In this case, the distance between horizontally adjacent groups is as wide as several times of wavelength.

The area defined by the thin solid line indicates a range suitable for antenna configuration 3. The area defined by the thin dashed line indicates a range suitable for antenna configuration 2.

For each radio resource, a UE or a set of two or more UEs is selected together with an antenna configuration allocated to the UE (or the UE pair or the UE set) responsive to the location information (including moving information) of UEs 40. Accordingly, the calculation amount and the processing time needed for scheduling can be reduced.

Figure 13:
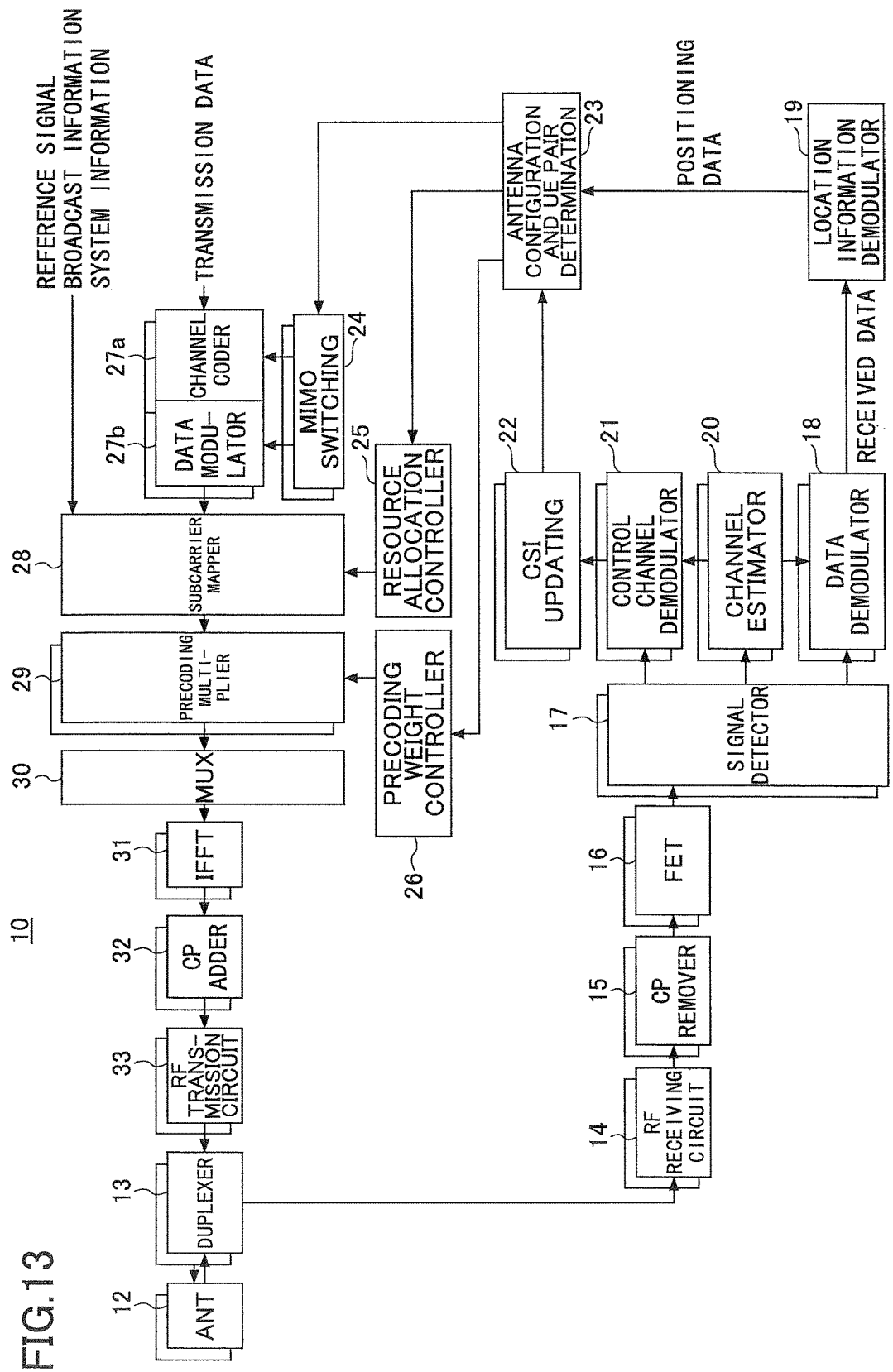
FIG. 13 illustrates a structure of a radio base station apparatus of the embodiment.

FIG. 13 is schematic diagram of a radio base station apparatus (or eNB) 10. Data to be transmitted to each user are subjected to channel coding at a channel coder 27a and data modulation at a data modulator 27b. The channel coding rate and the modulation scheme for transmission data addressed to each user are determined by a MIMO switching block 24 based upon an output of an antenna configuration and UE pair determination block 23. The transmission data having undergone channel coding and data modulation are input to a subcarrier mapper 28 together with a reference signal, a broadcast signal, system information, etc., and mapped to a subcarrier allocated by a resource allocation controller 25. Resource allocation is controlled by the resource allocation controller 25 based upon the output of the antenna configuration and UE pair determination block 23.

The mapped transmission data are multiplied by precoding weights at a precoding multiplier 29 and weighted through adjustment of the phase and the amplitude for each of the antennas 12. The precoding weights to be applied to the transmission data are controlled by a precoding weight controller 26 based upon the output of the antenna configuration and UE pair determination block 23.

The transmission signals addressed to the respective users are combined at a multiplexer (MUX) 30 and transmission data streams for the respective antennas 12 are generated. In this example, each antenna 12 forms an antenna port.

The transmission data stream for each antenna 12 undergoes inverse fast Fourier transform (IFFT) at an IFFT block 31, adding of a cyclic prefix (CP) at a CP adder 32, and frequency conversion at an radio frequency (RF) transmission circuit 33. The processed data stream is supplied through duplexer 13 to the associated antenna 12, and transmitted to the UE over a downlink channel.

An uplink signal from each UE is received at each antenna 12 of the multimode antenna 11 and input via the duplexer 13 to the associated RF receiving circuit 14. After frequency conversion to a baseband frequency at the RF receiving circuit 14, removal of the cyclic prefix at a cyclic prefix (CP) remover 15, and fast Fourier transform (FFT) at an FFT block 16, each user signal is detected at a signal detector 17. The data channel signal of each user signal is demodulated at a data demodulator 18 using a channel estimation value estimated by a channel estimator 20 using a demodulation reference signal, whereby a received data item is acquired.

A location information demodulator 19 extracts location information from the received data item and supplies the location information to the antenna configuration and UE pair determination block 23.

A control channel demodulator 21 demodulates a control channel using a channel estimation value estimated by the channel estimator 20 using a SCI-RS. A CSI updating block 22 takes the CSI of the user out of the control channel and updates the channel state information of this user. The updated CSI is supplied to the antenna configuration and UE pair determination block 23.

The antenna configuration and UE pair determination block 23 determines a UE pair and an antenna configuration at each resource based upon the positioning data and channel information of the UEs. Because the UE pair and the antenna configuration suitable to that UE pair are selected from among candidates already narrowed to a certain extent based upon the positioning data and the channel information of the UEs, efficient processing can be achieved without increasing the amount of calculation. When performing scheduling for a single user, the highest priority user and an antenna configuration to be allocated to this user are determined for the currently being processed radio resource.

The antenna configuration and UE pair determination block 23 also determines precoding weights for each transmission data item based upon the precoding matrix indicator (PMI) and rank indicator (RI) contained in the updated channel information. The determination result is supplied from the antenna configuration and UE pair determination block 23 to the MIMO switching block 24, the resource allocation controller 25, and the precoding weight controller 26. The resource allocation controller 25 carries out appropriate grouping on the antenna ports to set up the antenna configuration by changing the mapping of the antennas (or antenna ports) 12 according to the determined antenna configuration. In this manner, the transmission data addressed to the respective users are transmitted from the antennas 12 under the optimum antenna configuration.

Figure 14:
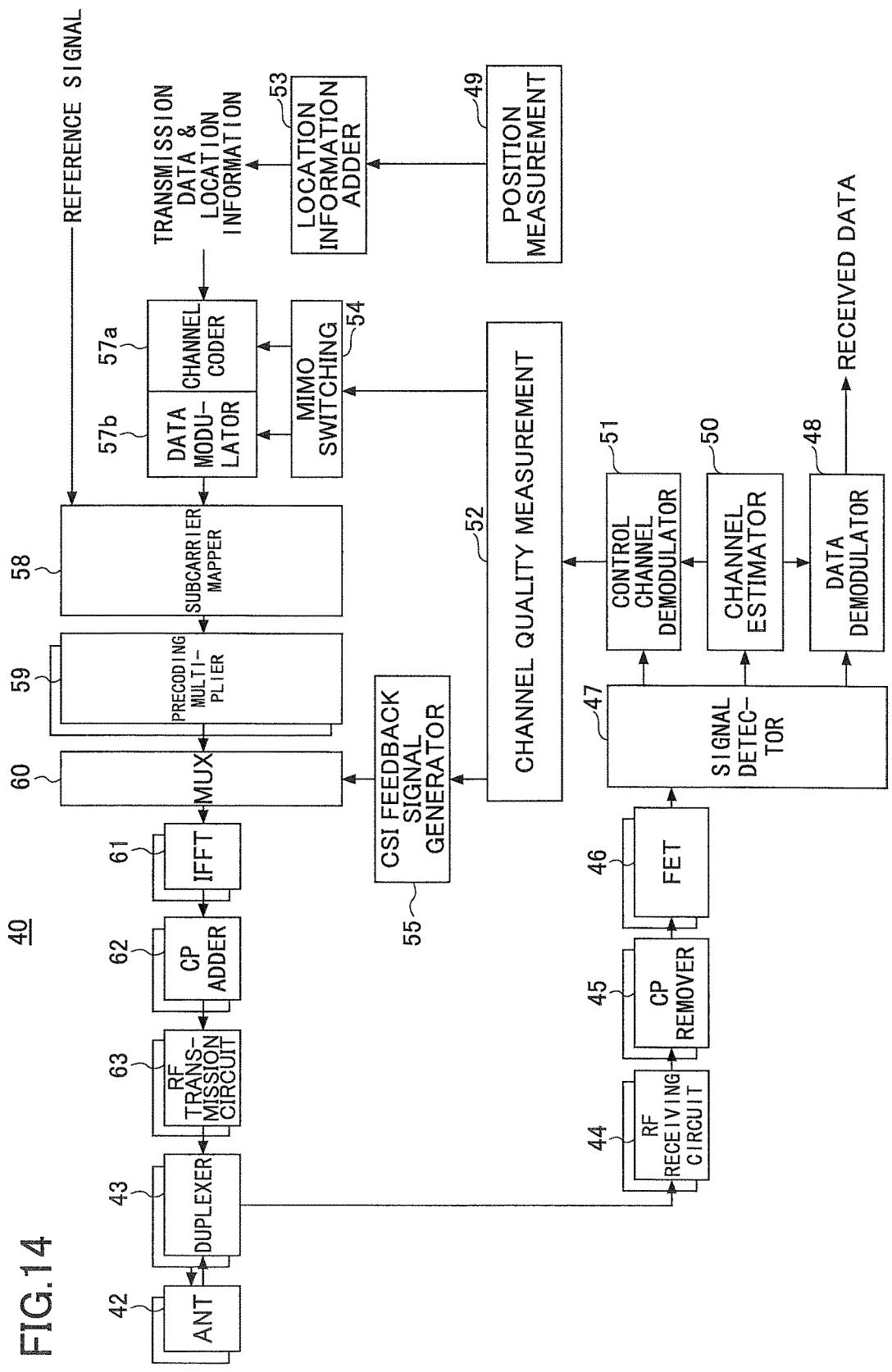
FIG. 14 illustrates a structure of user equipment of the embodiment.

FIG. 14 is a schematic diagram of a mobile device 40. A signal transmitted from the eNB 10 is received at each of the antennas 42 of the mobile device 40, input via an associated duplexer 43 to an associated RF receiving circuit 44, and converted to a baseband signal. After removal of cyclic prefix (CP) at a CP remover 45 and fast Fourier transform (FFT) at a FFT block 46, a signal addressed to the mobile device 40 is detected at a signal detector 47 from the received signal. The data channel signal in the detected signal is demodulated at a data demodulator 48 and decoded at the later stage to obtain the received data.

The CSI-RS received from the eNB 10 is input to a channel estimator 50 to perform channel estimation. A control channel demodulator 51 demodulates a control signal addressed to the mobile device 40 using a channel estimation value. A channel quality measurement block 52 measures a receiving quality of the downlink channel based on the demodulated control signal. The channel quality measurement block 52 may select PMI and RI based upon the measurement result. The channel quality measurement result is supplied to a CSI feedback signal generator 55 and a MIMO switching block 54.

The CSI feedback signal generator 55 generates a CSI feedback signal to report the channel quality indicator (CQI) measured by the channel quality measurement block 52 to the eNB 10. The PMI or RI may be included in the CSI feedback signal.

A position measurement block 49 measures and acquires location information. As has been described, the location information may include the moving speed and/or the moving direction of the UE 40, in addition to the current location. The measurement result is added to transmission data by a location information adder 53.

The transmission data and the location information are subjected to channel coding at a channel coder 57a and data modulation at a data modulator 57b. The channel coding rate and the modulation scheme are determined by the MIMO switching block 54 responsive to the MIMO transmission state. At a subcarrier mapper 58, the channel-coded and modulated transmission data are mapped together with a reference signal to subcarriers allocated by a scheduler (not illustrated).

The mapped transmission data are multiplied by precoding weights by a precoding multiplier 59 and weighted for each of the antennas 42. The uplink precoding weights may be sent from the eNB 10 to UE over a downlink control channel.

The transmission data and the CSI feedback signal are combined at a multiplexer (MUX) 60 and transmission data streams are generated for the respective antennas 42. For each antenna 42, the transmission signal undergoes inverse fast Fourier transform (IFFT) at an IFFT block 61, adding of cyclic prefix (CP) at a CP adder 62, and frequency conversion to a radio frequency at an RF transmission circuit 63. The processed signal is supplied via the duplexer 43 to the associated antenna 42 and transmitted from the antenna 42.

Embodiment 2

Figure 15:
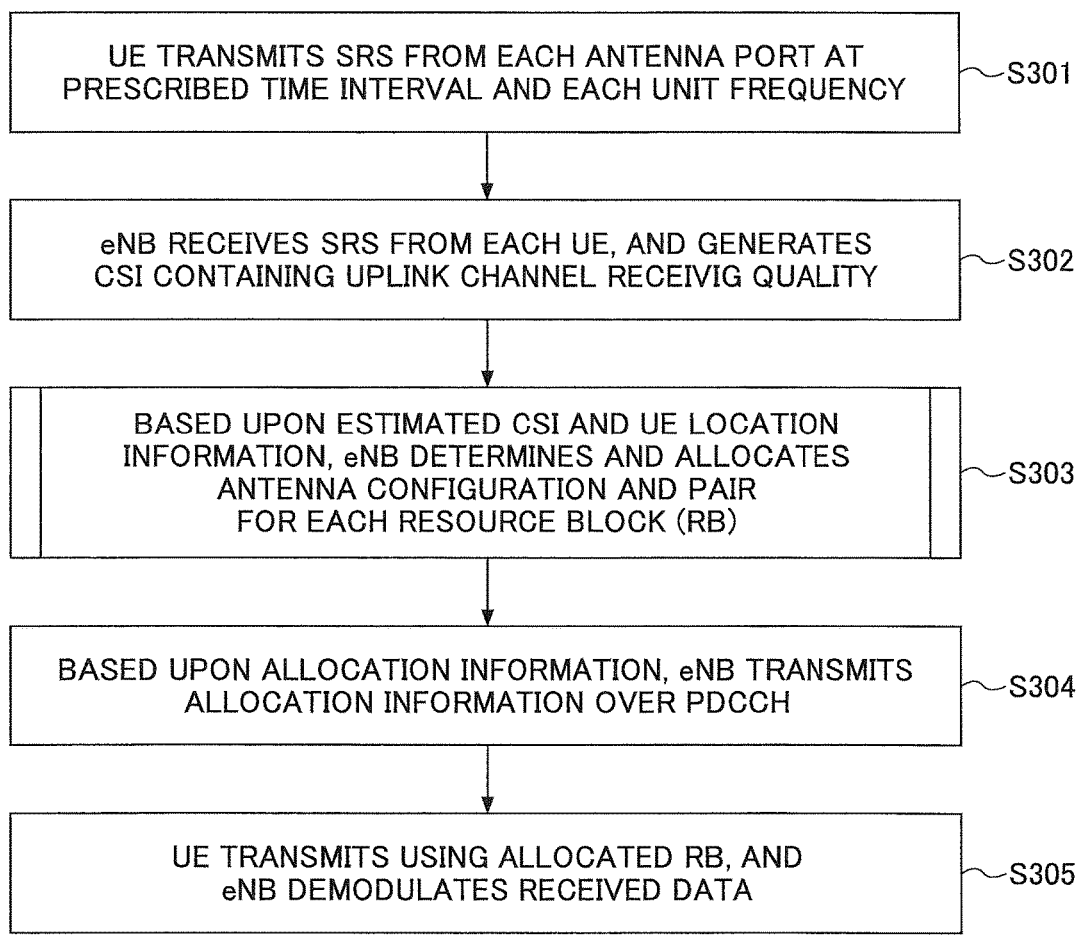
FIG. 15 is a flowchart of a scheduling method including determination of antenna configuration according to Embodiment 2.

FIG. 15 is a flowchart of a scheduling method including determination of antenna configuration according to Embodiment 2. In Embodiment 2, uplink scheduling is explained.

In step S301, UE 40 transmits a reference signal from each antenna port (or each antenna group) at a predetermined time interval and every unit frequency. The uplink reference signal is, for example, a sounding reference signal (SRS).

In step S302, eNB 10 receives an SRS from each UE 40 and generates channel state information (CSI) including the uplink channel receiving quality.

In step S303, based upon the estimated CSI and location information of each UE 40, the eNB 10 determines a single UE (or a set of two or more UEs) and an antenna configuration to be allocated to the UE (or the UE pair or UE set) for each uplink resource (such as each resource block or each channel). The details of this step are described below. The location information of each UE 40 may be received from that UE 40, or alternatively, the eNB 10 may estimate the location information.

In step S304, the eNB 10 transmits allocation information to each UE 40 over PDCCH according to the determined result.

In step S305, each UE 40 transmits data under the instructed antenna configuration using an uplink resource (e.g., RB) allocated by the eNB 10. The eNB 10 demodulates the received data.

Figure 16:
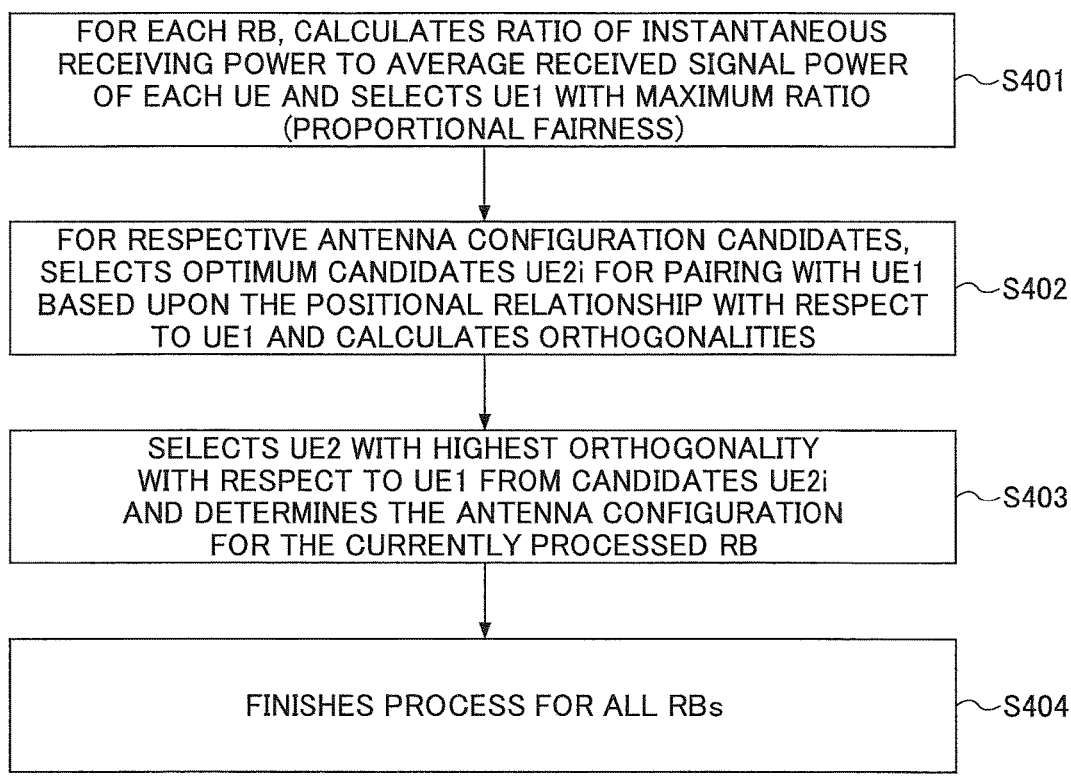
FIG. 16 is an illustrative flow of determination of a UE pair and antenna configuration in the method of FIG. 15.

FIG. 16 is a flowchart illustrating determination step S303 of FIG. 15 for determining an antenna configuration and a UE pair. In step S401, the eNB 10 calculates a ratio of instantaneous received power to the average receiving signal power for each UE at every RB, and selects a UE with the maximum ratio (which UE is referred to as "UE1") by proportional fairness.

Then, in step S402, for each of "i" candidates of antenna configuration (where "i" denotes the total number of antenna configurations and is a positive integer (i>0)), the optimum candidate UE (which UE is referred to as "UE2i") to be paired with UE1 is selected from all the UEs 40 other than UE1, based upon the positional relationship with UE1 and the antenna configuration selection scheme illustrated in FIG. 12. With this method, it is unnecessary to investigate the channel orthogonality in round robin between the UE1 and all the other existing UEs 40. The orthogonality between the candidate pair UE1 and UE2i is calculated for each antenna configuration.

Then, in step S403, an antenna configuration j with the highest orthogonality is selected from among i antenna configurations. The pair UE1 and UE2j with the highest orthogonality is finally determined. Thus, the antenna configuration providing the highest orthogonality and the currently processed RB are selected for that UE pair.

Then, in step S404, steps S401 to S403 are repeated for all the RBs, and the process terminates when all the RBs have been processed. In this manner, the optimum antenna configuration can be selected during the scheduling for UEs 40 without increasing the processing amount.

When allocating an uplink resource to a single user, the same scheme applies and an antenna configuration is selected upon scheduling responsive to the location information of each user.

Embodiment 3

Figure 17:
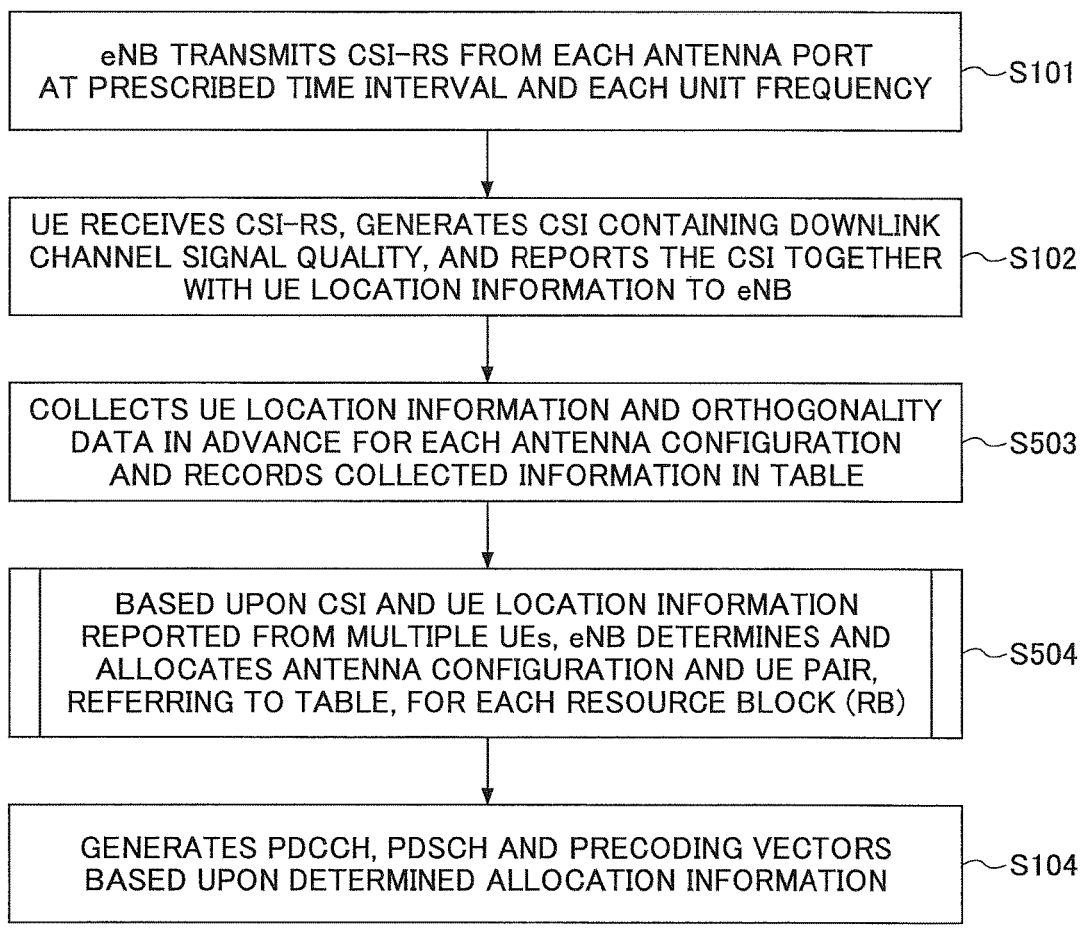
FIG. 17 is a flowchart of a scheduling method including determination of antenna configuration according to Embodiment 3.

FIG. 17 is a flowchart of a scheduling method including determination of antenna configuration according to Embodiment 3. Embodiment 3 provides a modification of allocation of downlink radio resources (RBs) and beamforming of Embodiment 1. The same steps as those in Embodiment 1 are denoted by the same symbols.

In step S101, the eNB 10 transmits a downlink reference signal such as a CSI-RS from each antenna port at a prescribed time interval and every unit frequency.

In step S102, each UE 40 receives the CSI-RS, and generates CSI including the downlink channel receiving quality. The CSI is transmitted together with location information of UE 40 to the eNB 10 over an uplink control channel.

Then, in step S503, the eNB 10 collects in advance location information of UEs 40 existing in the serving area and data representing orthogonality levels between UEs for each of the antenna configurations, and records the collected information in a database in the form of, for example, a table.

In step S504, eNB 10 determines, for each of the downlink radio resource blocks (RB), a UE pair to which the focused-on RB is to be allocated and an antenna configuration for the UE pair, referring to the table and based upon the CSI and location information reported from multiple UEs 40.

In step S104, the eNB 10 generates PDCCH, PDSCH, and precoding weights based upon the determined allocation information. Control signals and data signals are transmitted over the PDCCH and PDSCH, respectively, using a directional beam formed by the precoding weights. When performing scheduling for a single user, the same scheme applies. By collecting user location information in advance for each of the antenna configurations, an antenna configuration with high robustness against the user's moving direction and/or the moving speed can be selected upon allocation of the resources.

Figure 18:
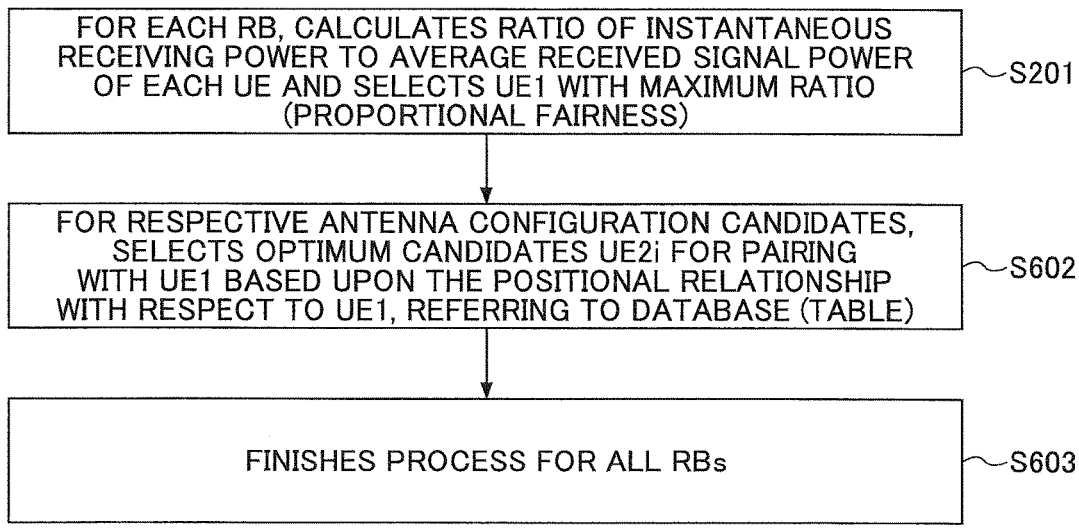
FIG. 18 is an illustrative flow of determination of a UE pair and antenna configuration in the method of FIG. 17.

FIG. 18 is an illustrative flow of the determination of an UE pair and the antenna configuration performed in step S504 of FIG. 17. In step S201, the eNB 10 calculates a ratio of the instantaneous received power to the average received power of the signal from each of the UEs 40 at each RB, and selects a UE with the maximum ratio (which UE is referred to as "UE1") by proportional fairness.

Then, in step S602, eNB 10 selects the optimum candidate of UE (as UE2i) to be paired with the UE1 from the positional relationship for each of the antenna configurations, by referring to the table (or the database). Then, eNB 10 selects the antenna configuration with the highest orthogonality, referring to the table. Thus, the pair UE1 and UE2 are determined together with the antenna configuration.

Then, in step S603, steps S201 and S602 are repeated for all the RBs and the process terminates. With this method, the eNB 10 has information about orthogonality between UEs in advance and it is unnecessary to calculate orthogonalty between UEs every time. The amount of calculation can be reduced and scheduling can be carried out more efficiently.

Embodiment 4

Figure 19:
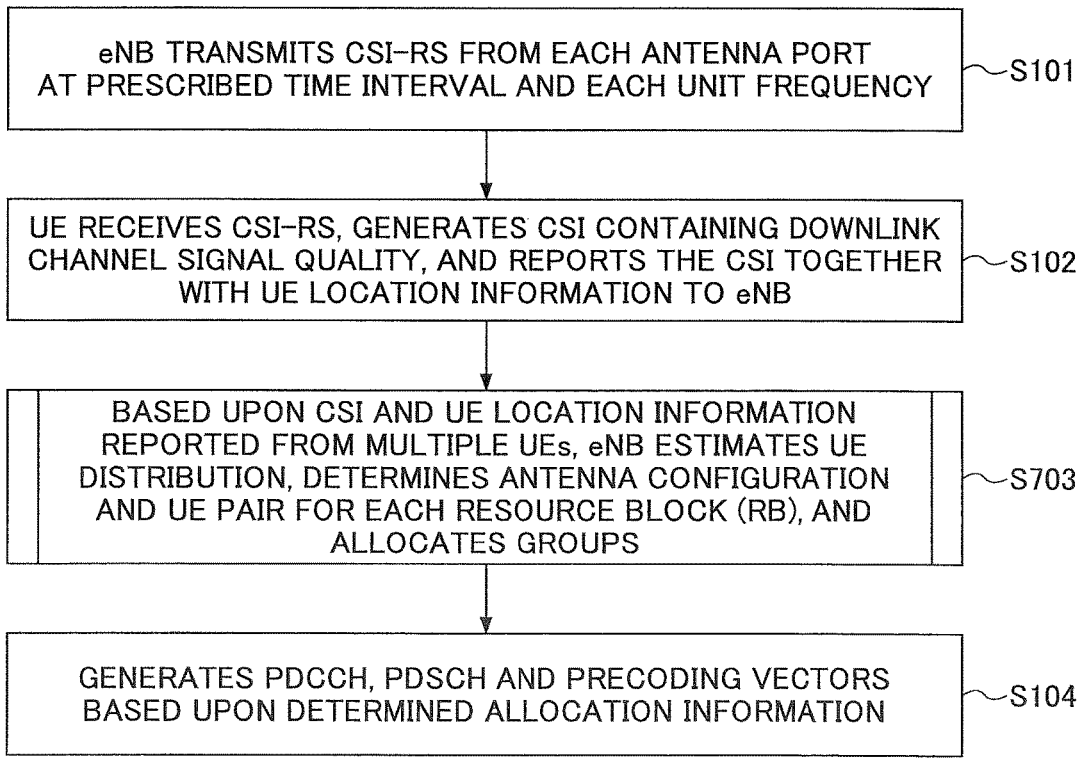
FIG. 19 is a flowchart of a scheduling method including determination of antenna configuration according to Embodiment 4.

FIG. 19 is a flowchart of a scheduling method including determination of antenna configuration according to Embodiment 4. In Embodiment 4, in carrying out downlink scheduling together with determination of antenna configurations, distribution of UEs 40 is taken into account.

In step S101, the eNB 10 transmits a downlink reference signal such as CSI-RS from each antenna port at a prescribed time interval and every unit frequency.

In step S102, each UE 40 receives the CSI-RS and generates CSI including the downlink channel receiving quality. The generated CSI is transmitted together with location information of UE 40 to the eNB 10 over an uplink control channel.

In step S703, the eNB 10 determines distribution of UEs 40 existing in the serving area based upon the location information reported from each of the UEs 40. Based upon the CSI from the UEs 40 and the distribution of the UEs 40, the eNB 10 determines a single UE or a set of two or more UEs, together with an antenna configuration to be allocated to the UE or the UE set for each radio resource block (RB).

In step S104, the eNB 10 generates PDCCH, PDSCH, and preceding weights based upon the determined allocation information.

Figure 20:
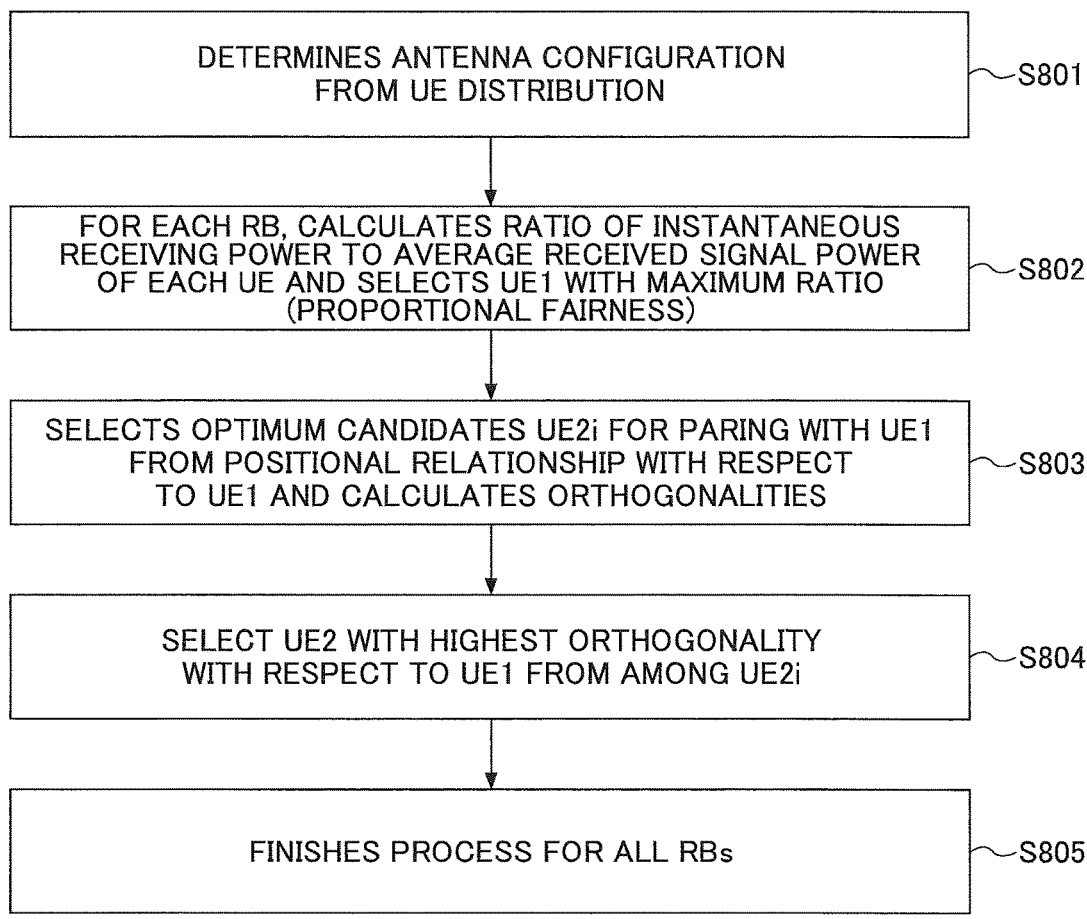
FIG. 20 is an illustrative flow of determination of a UE pair and antenna configuration in the method of FIG. 19.

FIG. 20 is an illustrative flow of determination of antenna configuration and a UE pair in step S703 of FIG. 19. In step S801, the eNB 10 determines a candidate of antenna configuration from the distribution of UEs 40 according to the scheme of FIG. 21. Details of the relation between the distribution of UEs 40 and antenna configuration is described below.

In step S802, a ratio of the instantaneous received power to the average received power of the signal from each of the UEs 40 is calculated for each RB to select a UE with the maximum ratio (which UE is referred to as "UE1") by proportional fairness.

In step S803, the optimum candidate UE (which UE is referred to as "UE2*i*") to be paired with UE1 is selected for each of "i" antenna configuration candidates based upon the positional relationship with UE1, and the orthogonality between the candidate pair is calculated for each antenna configuration.

In step S804, from among "UE2*i*"'s, a UE2 under the antenna configuration achieving the highest orthogonality with respect to UE1 is selected, and that UE pair is determined together with the antenna configuration j of the highest orthogonality, for which UE pair the currently processed resource block is allocated.

In step S805, steps S802 to S804 are repeated for all the RBs, and the process terminates.

Figure 21:
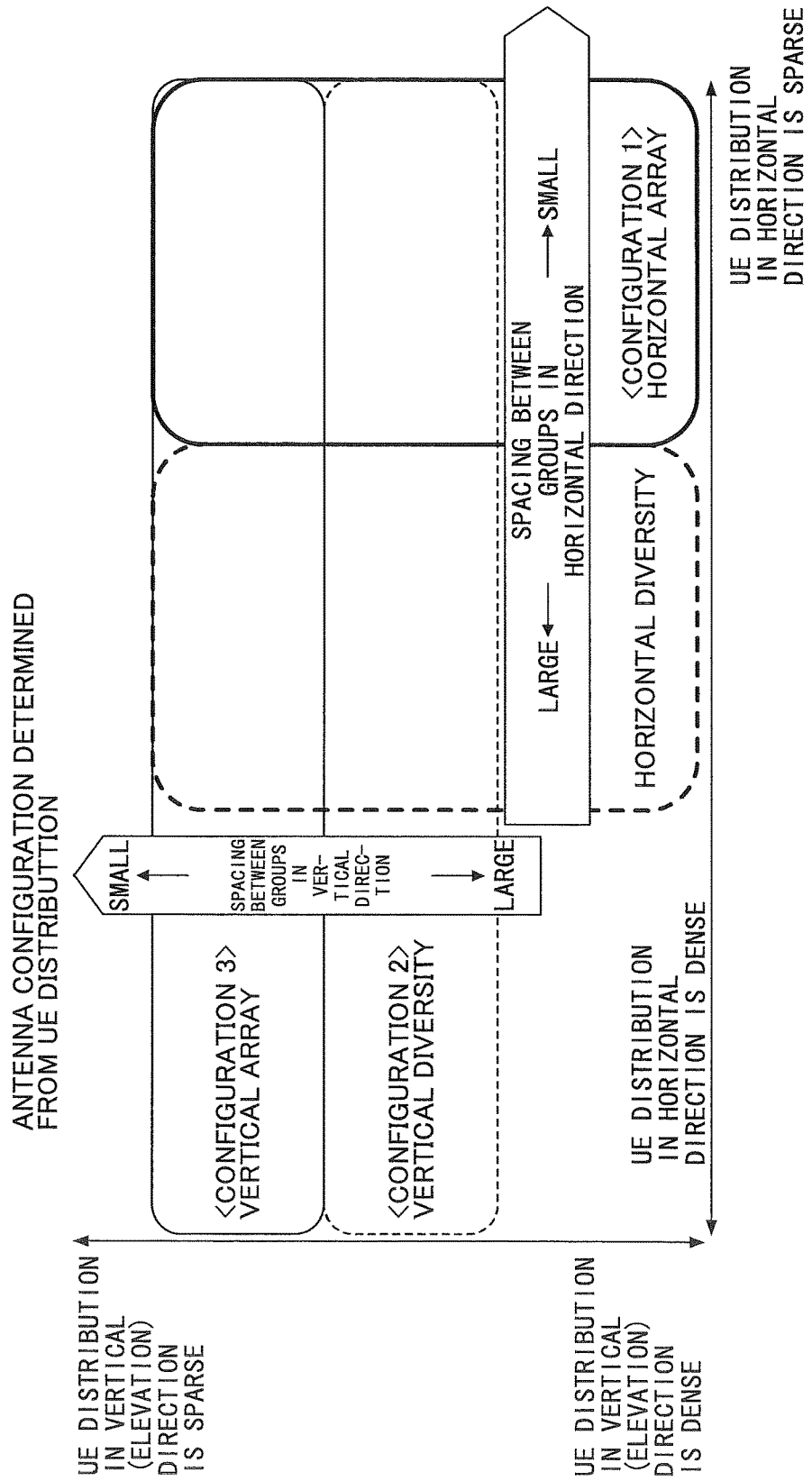
FIG. 21 is a diagram illustrating selection of an antenna configuration responsive to UE distribution.

FIG. 21 illustrates a relationship between UE distribution and antenna configuration. The horizontal axis represents distribution density of UEs 40 in the horizontal direction (or circumferential or tangential direction). As approaching the right-hand side of the figure, the UE distribution density decreases. The vertical axis represents distribution density of UEs 40 in the vertical direction (or radial or elevation/depression angle direction). As approaching the top of the figure, the UE distribution density decreases.

As the distribution of UEs 40 becomes sparse in the horizontal direction, the distance between horizontally adjacent antenna port groups of the multimode antenna 11 becomes small. In this case, correlation between antenna ports is low, separation of users is not difficult, and antenna configuration 1 (horizontal array configuration) may be employed. When the distribution density of UEs 40 in the horizontal direction increases to a certain extent, it is preferable to increase the distance between horizontally adjacent groups to several times of wavelength to produces horizontal diversity configuration.

As the distribution of UEs 40 becomes sparse in the vertical direction (or the radial direction of the cell), the distance between vertically adjacent antenna port groups of the multimode antenna 11 becomes small. In this case, antenna configuration 3 (vertical array configuration) may be employed. When the distribution density of UEs 40 in the vertical direction (or cell-radial direction) increases to a certain extent, it is preferable to increase the distance between vertically adjacent groups to several time of wavelength to produce a vertical diversity configuration.

Other Examples

Figure 22:
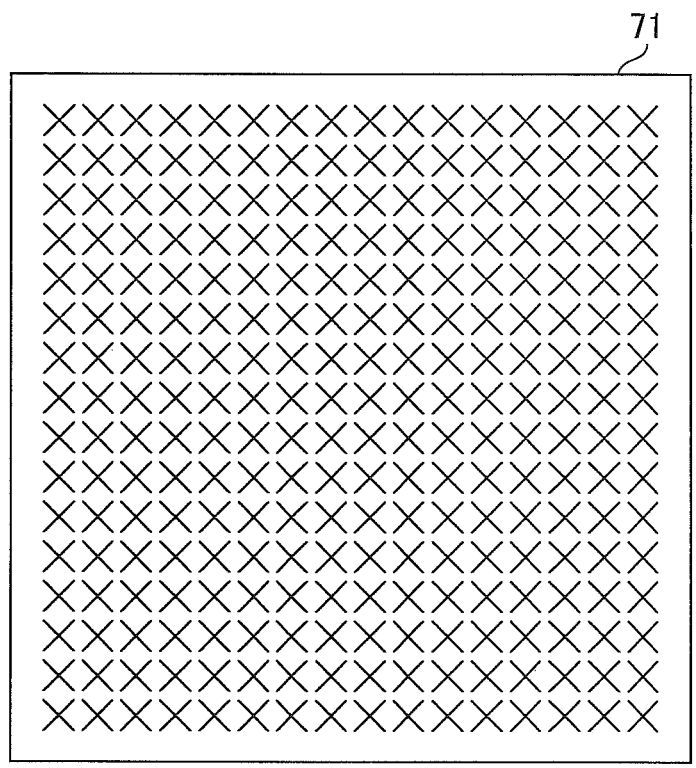
FIG. 22 illustrates another example of a multimode antenna used in a radio base station apparatus.

FIG. 22 illustrates a multimode antenna 71 with another arrangement of elements. The multimode antenna 71 has sixteen physical antenna elements in the horizontal direction and sixteen physical antenna elements in the vertical direction. Each physical antenna element is capable of treating vertically polarized waves and horizontally polarized waves. Accordingly, a multimode antenna with the total of 16×16×2 elements is presented.

When each element forms an antenna port, the total of 512 CSI-RSs are transmitted from the respective antenna elements. These antenna elements can be divided into groups with an appropriate spacing between groups to set up antenna configurations 1 to 3, horizontal diversity configuration, etc. A downlink reference signal may be transmitted from each of the branches formed by grouping the antenna ports, in place of transmitting the downlink reference signal from each of the antenna ports.

FIG. 23 illustrates another example of the relationship between location information of UEs 40 and antenna configuration. In this example, generation of antenna port groups is performed successively. It is unnecessary to always use all the antenna elements. For example, when the angle difference between UE1 and UE2*i* in the horizontal direction increases, or when the moving speed in the vertical direction (elevation/depression angle direction) increases, grouping may be carried out so as to decrease the distance between horizontally adjacent antenna groups. When the angle difference between UE1 and UE2*i* in the vertical direction (or elevation/depression angle direction) increases, or when the moving speed in the horizontal direction increases, grouping may be carried out so as to decrease the distance between vertically adjacent antenna groups.

As has been stated above, the techniques of the embodiments can schedule users together with allocation of antenna configuration, while reducing processing delay, under the condition that the number of antenna ports increases greatly to deal with various types of communication using a multimode antenna with multiple antenna configurations.

Although in the embodiments a user pair with high orthogonality is selected for each resource block, a user pair may be determined using an appropriate scheme for an arbitrary unit resource. The techniques of the embodiments are applicable not only to scheduling for two or more users, but also to scheduling for a single user, and a use for which a resource is to be allocated can be determined together with the antenna configuration employed for that user.

When location information cannot be acquired, the phase difference information of an uplink signal from a UE between antenna ports may be used.

The user location information may not be always acquired by UEs and transmitted to eNB. User location may be estimated at the eNB using uplink signals. When a UE acquires location information, GPS data or range data representing a distance from the eNB may be employed.

In addition, angle difference information between UEs performing uplink communication may be used as location information, or in place of location information. A Rank index may be determined together with antenna configuration and a UE or a UE pair or UE set for which a resource is to be allocated.

The layout of physical antenna elements may not be limited to a horizontal and vertical array. The present invention is applicable to a vertical array, a horizontal array, or a three-dimensional (3D) cubic array.

This patent application is based upon and claims the benefit of the priority of Japanese Patent Application No. 2013-163655 filed Aug. 6, 2013, which is incorporated herein by reference in its entirety.

What is claimed is:

1. A radio base station apparatus comprising:
   a multimode antenna providing multiple antenna configurations, each of the antenna configurations being determined by dividing antenna ports of the multimode antenna into groups;
   a transmission unit configured to transmit a downlink reference signal from each antenna port;
   an acquisition unit configured to acquire channel information of a user equipment based on the downlink reference signal and at least one of location information of the user equipment and phase difference information between the antenna ports of signals transmitted from the user equipment; and
   a determination unit configured to determine scheduling for the user equipment together with one of the antenna configurations to be allocated to the user equipment, based upon the acquired information,
   wherein the determination unit determines a pair of said user equipment and another user equipment together with the antenna configuration to be allocated to the pair for a radio resource based upon the acquired information,
   wherein the antenna configuration is set up by grouping the antenna ports unevenly by sharing at least one antenna port between a first horizontal polarization group and a second vertical polarization group,
   wherein the multimode antenna forms beams with different beam widths for said user equipment of said determined pair and said other user equipment of said determined pair, and
   wherein the different beam widths are based, at least in part, on the first horizontal polarization group and the second vertical polarization group.

2. The radio base station apparatus according to claim 1, further comprising:
   a resource allocation controller configured to control grouping of the antenna ports based upon a determination result of the determination unit.

3. The radio base station apparatus according to claim 1, wherein the determination unit determines a combination of the user equipment and the antenna configuration to be allocated to the user equipment based upon at least one of a moving speed of the user equipment in horizontal direction, a moving speed of the user equipment in vertical direction, an angle difference in the horizontal direction with another user equipment, an angle difference in the vertical direction with said other user equipment, a moving direction, and distribution of a plurality of said other user equipment connected to the radio base station apparatus.

4. The radio base station apparatus according to claim 1, further comprising:
   a table storing location information of one or more of the user equipment connected to the radio base station apparatus or the phase difference information for each of the antenna configurations,
   wherein the determination unit determines said user equipment and the antenna configuration to be allocated to said user equipment for a radio resource based upon the acquired location information or phase difference information, referring to the table.

5. A scheduling method comprising:
   at a base station with a multimode antenna providing multiple antenna configurations, each of the antenna configurations being determined by dividing antenna ports of the multimode antenna into groups, transmitting a downlink reference signal from each antenna port, and acquiring channel information of a user equipment based on the downlink reference signal and at least one of location information of the user equipment and phase difference information between the antenna ports of signals transmitted from the user equipment;
   at the base station, determining scheduling for the user equipment together with one of the antenna configurations to be allocated to the user equipment based upon the acquired information,
   wherein the determining the scheduling includes determining a pair of said user equipment and another user equipment together with the antenna configuration to be allocated to the pair for a radio resource based upon the acquired information,
   the method further comprising:
   setting up the antenna configuration by grouping the antenna ports unevenly by sharing at least one antenna port between a first horizontal polarization group and a second vertical polarization; and
   forming beams with different beam widths for said user equipment for said determined pair and said other user equipment for said determined pair,
   wherein the different beam widths are based, at least in part, on the first horizontal polarization group and the second vertical polarization group.

6. The scheduling method according to claim 5, further comprising:
   grouping the antenna ports at a variable group interval based upon the determined antenna configuration.

7. The scheduling method according to claim 5,
   wherein a combination of the user equipment and the antenna configuration to be allocated to the user equipment is determined based upon at least one of a moving speed of the user equipment in horizontal direction, a moving speed of the user equipment in vertical direction, an angle difference in the horizontal direction with said other user equipment, an angle difference in the vertical direction with said other user equipment, a moving direction, and distribution of a plurality of said other user equipment connected to the radio base station apparatus.

8. The scheduling method according to claim 5, further comprising:

storing location information of one or more of the user equipment connected to the radio base station apparatus or the phase difference information for each of the antenna configurations, wherein said user equipment and the antenna configuration to be allocated to said user equipment are determined for a radio resource based upon the acquired location information or phase difference information, referring to the stored information.

* * * * *